United States Patent [19]

Durvasula et al.

[11] Patent Number: 4,847,416

[45] Date of Patent: Jul. 11, 1989

[54] CAPPING OF POLYOLS WITH AROMATIC AMINES

[75] Inventors: Visweswara R. Durvasula, Cheshire; Fred A. Stuber, North Haven, both of Conn.

[73] Assignee: The Dow Chemical Company, Midland, Mich.

[21] Appl. No.: 35,121

[22] Filed: Apr. 6, 1987

Related U.S. Application Data

[63] Continuation-in-part of Ser. No. 923,255, Oct. 27, 1986, abandoned.

[51] Int. Cl.$^4$ .................... C07C 91/40; C07C 149/42; C08G 18/00; C08G 18/18
[52] U.S. Cl. .................... 564/443; 521/163; 528/52; 564/440
[58] Field of Search ............... 564/440, 443; 521/163; 528/52

[56] References Cited

U.S. PATENT DOCUMENTS

| | | | |
|---|---|---|---|
| 2,888,439 | 5/1959 | Simons | 260/77.5 |
| 3,256,213 | 6/1966 | Gmitter et al. | 260/2.5 |
| 3,436,359 | 4/1969 | Hubin et al. | 260/2 |
| 3,654,370 | 4/1972 | Yeakey | 260/584 B |
| 3,808,250 | 4/1974 | Blahak et al. | 260/455 R |
| 3,847,992 | 11/1974 | Hotchkiss | 260/584 B |
| 4,031,049 | 6/1977 | Hirosawa et al. | 521/163 |
| 4,129,741 | 12/1978 | Schniedt et al. | 560/50 |
| 4,169,206 | 9/1979 | Mazanek et al. | 560/50 |
| 4,328,322 | 5/1982 | Baron | 521/163 |
| 4,537,945 | 8/1985 | Otani et al. | 528/68 |
| 4,609,683 | 9/1986 | Grigsby et al. | 521/159 |
| 4,609,684 | 9/1986 | Grigsby et al. | 521/163 |

FOREIGN PATENT DOCUMENTS

| | | | |
|---|---|---|---|
| 1015099 | 2/1977 | Canada | 521/163 |
| 3628316 | 2/1988 | Fed. Rep. of Germany . | |

Primary Examiner—Richard L. Raymond
Assistant Examiner—Peter G. O'Sullivan
Attorney, Agent, or Firm—James S. Rose

[57] ABSTRACT

Disclosed is a class of poly(aminoaromatic) compounds (I) obtained by capping polymeric polyols or polythiols with aromatic amine groups wherein the latter groups are linked by —O— or —S— to the polyol (polythiol) residues. Also disclosed are the precursor poly(nitroaromatic) compounds (II) from which the compounds (I) are derived.

The polyamines are characterized by amine reactivities in respect of isocyanate polyaddition reactions which allows for polymer reaction rates that are intermediate of prior art related polyamine compounds.

Accordingly, the compounds (I) find their prime utility in the formation of synthetic resins containing polyurea linkages.

12 Claims, No Drawings

CAPPING OF POLYOLS WITH AROMATIC AMINES

CROSS-REFERENCE TO RELATED APPLICATION

This application is a continuation-in-part of copending application Ser. No. 923,255 filed Oct. 27, 1986 abandoned.

FIELD OF THE INVENTION

This invention relates to the preparation of high molecular weight aromatic polyamines and is more particularly concerned with aromatic amine capped polyols or polythiols, the nitroaromatic precursors therefor, and the novel polyisocyanate polyaddition products derived from said polyamines.

DESCRIPTION OF THE PRIOR ART

The reaction of relatively high molecular weight polyamines containing terminal amine groups with polyisocyanates to yield polyaddition products containing urea linkages is well known. Certain advantages of such polyureas over their polyurethane counterparts have been recognized in higher thermal resistance, improved tensile properties and overall strength. Unfortunately, prior art polyamines employed for such purposes have drawbacks due largely to being either too fast or else too slow in the polyaddition polymerizations.

Aliphatic based polyamines as typically disclosed in U.S. Pat. Nos. 3,436,359, 3,654,370, and 3,847,992 are possessed of very high reactivity rates in polyaddition polymerizations with polyisocyanates. In fact, in some cases, the polyamino compounds react almost instantaneously and to overcome the problem the polyamines are employed in the form of their salts as taught in U.S. Pat. No. 3,256,213. The latter patent includes aromatic amine compounds also but neglects to show their much slower reactivities compared with the reference's principal aliphatic polyamines.

Generally speaking, the aromatic amine compounds are just the opposite tending to be sluggish in their reactivity with polyisocyanates. Typical of aromatic amines are those disclosed in U.S. Pat. Nos. 2,888,439, 3,808,250, 4,129,741, 4,169,206, 4,328,322, 4,537,945, 4,609,683 and 4,609,684. These compounds have terminal aminophenyl groups linked to polyvalent residues through ester linkages, amide linkages, urethane linkages, and aromatic amido-aromatic ester linkages.

The utility of both the aliphatic and aromatic based amine compounds in the preparation of reaction injection molded elastomers has been disclosed in such references as U.S. Pat. Nos. 4,433,067 and DE No. 3147736.

In view of the aforementioned rapid and slow reactivities of the prior art amine compounds it would be highly desirable to provide a class of high molecular weight polyamines having amine reactivities which are intermediate of those discussed above. Additionally, it would be highly desirable if the polyamines could be provided with a range of reactivities within the class itself.

SUMMARY OF THE INVENTION

This invention is directed to poly(aminoaromatic) compounds having the formula

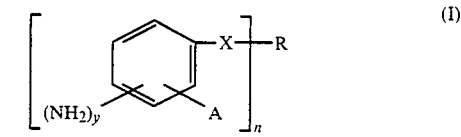

wherein R is the residue after removal of hydroxyl groups or mercapto groups respectively of a polymeric polyol or polythiol having a molecular weight of from about 400 to about 10,000 and a functionality n of from about 2 to about 6, —X— represents —O— when said R is the residue of a polyol and —S— when said R is the residue of a polythiol, y is 1 or 2 and A is selected from the group consisting of hydrogen and an inert substituent.

This invention is also directed to poly(nitroaromatic) precursor compounds (II) which correspond to formula (I) above except for the replacement of the —NH$_2$ group of (I) by an —NO$_2$ group in (II).

This invention is also directed to molded synthetic resins containing polyurea linkages obtained from the reaction of (I) with organic polyisocyanates, optionally in the presence of polymeric polyols and/or extenders.

This invention is also directed to films cast from solutions of the above described polyurea synthetic resins based on the poly(aminoaromatic) compounds of formula (I).

The term "inert substituent" means any substituent that does not react with an amine, nitro, or hydroxyl group and is inclusive of lower-alkyl of 1 to 8 carbon atoms, inclusive, such as methyl, ethyl, propyl, butyl, amyl, hexyl, heptyl, octyl, and isomeric forms thereof; aryl of 6 to 12 carbon atoms, inclusive such as phenyl, tolyl, naphthyl, biphenylyl, and the like; aralkyl of 7 to 10 carbon atoms, inclusive, such as benzyl, phenethyl, and the like; cycloalkyl of 4 to 6 carbon atoms, inclusive, such as cyclobutyl, cyclopentyl, cyclohexyl, and the like; alkoxy of 1 to 8 carbon atoms, inclusive, such as methoxy, ethoxy, propoxy, butoxy, pentyloxy, hexyloxy, heptyloxy, octyloxy, and the like.

Unexpectedly, this novel class of polyamines defined by formula (I) is characterized by amine reactivities which, for the most part, are intermediate of the two classes of prior art polyamines described above. Additionally, depending on the mode of substitution of the amine groups, the present polyamines can be provided with varying reactivities within the group.

The compounds of formula (I) can be used as co-reactants and/or curatives with epoxy resins and in the formation of various types of polyaddition products with organic polyisocyanates. Exemplary of such polyaddition products are polyureas, polyurethane-polyureas, and the like.

The compounds of formula (II) can be used as solubilizing agents in combination with aqueous alkaline flooding media in the recovery of hydrocarbons from subterranean hydrocarbon-bearing formations. However, they find their prime utility as intermediates for the production of compounds of formula (I).

DETAILED DESCRIPTION OF THE INVENTION

The preparation of the aminoaromatic compounds of formula (I) from the nitroaromatic compounds (II) is readily carried out using procedures well known in the art for the reduction of aromatic nitro groups to the corresponding primary amines in accordance with the following overall schematic equation:

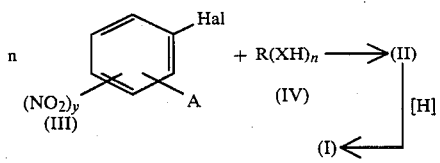

wherein R, X, A, y and n are as defined above and Hal represents halogen inclusive of fluorine, chlorine, bromine and iodine (preferably chlorine and bromine, most preferably chlorine). The preparation of the compounds (II) will be discussed in detail below.

Typically, the compounds (I) are conventionally produced from the nitro precursors by reduction with base metals, e.g. tin or iron, in the presence of acids. Alternatively, they are obtained by the catalytic hydrogenation of the nitro groups using well known hydrogenation procedures. Obviously, the amino compounds may be prepared by any other known methods.

Preferably, the products are produced by the catalytic hydrogenation method. For typical methods see "Catalytic Hydrogenation over Platinum Metals" by Paul N. Rylander, 1967, Academic Press, New York, N.Y. Any of the catalysts known to be useful for the reduction of aromatic nitro groups can be employed inclusive of Raney nickel. A preferred group of catalysts is comprised of the platinum group metals which includes ruthenium, rhodium, palladium, osmium, iridium, and platinum. Preferably, the catalyst is supported on a carrier such as activated carbon, silica gel, alumina, diatomaceous earth, pumice, and the like. The exact proportions in which the elemental metal is present on the carrier is not a critical factor. Generally speaking, the metal can vary from about 0.05 to about 40 percent by weight, preferably from about 0.5 to 20, and, most preferably, from about 5 to about 10 percent by weight.

The proportions of catalyst employed expressed as the pure metal in respect of the nitro group to be reduced will advantageously fall within the range of from about 0.05 to about 10 mole percent of metal per equivalent of nitro group. Preferably, the range is about 0.1 to about 1.0 mole percent. The term "equivalent of nitro group" means the nitro equivalent weight which is obtained by dividing the molecular weight of the nitroaromatic compound (II) by the number of nitro groups per mole.

The hydrogenation is conducted in the liquid phase in the presence of the hydrogen and the catalyst component which, generally speaking, calls for the use of a solvent but the latter is not absolutely necessary. Any solvent known to be useful for catalytic hydrogenation methods but inert to the compounds (I) and (II) may be employed. Illustratively, the following solvents can be used solely or as mixtures thereof: aromatic hydrocarbons such as benzene, toluene, xylene and the like; alcohols such as methanol, ethanol, propanol, isopropanol, and the like; esters such as ethyl acetate, ethyl propionate, ethyl butyrate and the like; ethers such as dioxane, tetrahydrofuran and the like; and, water either alone or in combination with the above solvents. The use of liquid ammonia is also contemplated. The amount of solvent is not critical per se and any amount found to be efficacious can be employed. Advantageously, the nitroaromatic compound (II) is employed in at least 10 percent by weight in the solvent, preferably, from about 20 to about 70 percent by weight, and, most preferably, about 25 to about 50 percent by weight.

The exact choice of temperature in any given hydrogenation is a function of the specific catalyst activity, hydrogen pressure, and the like. Advantageously, it can fall within a range of from about 0° C. to about 200° C., preferably from about 15° C. to about 100° C., most preferably about 20° C. to about 50° C.

Similarly as with temperature noted above, the hydrogen pressure employed can cover any effective range such as from about 15 psig up to any reasonable working pressure. Generally speaking the pressure will be from about 15 psig to about 200 psig, preferably from about 30 to about 60 psig.

Progression of the reduction is readily followed by monitoring the hydrogen uptake. Accordingly, the reduction is terminated at the point at which the theoretical quantity of hydrogen has been absorbed. Alternatively, the reduction is continued until no further hydrogen can be consumed.

Isolation of the compound (I) is carried out using well known conventional procedures. The catalyst is separated using standard methods of filtration and is readily recoverable either for direct recycling to another reduction or subjected to recovery steps prior to recycle. Product separation is then achieved by removing solvent using distillation methods under atmospheric and/or reduced pressures. Generally speaking, the product is in the form of a mobile to viscous liquid. If further purification is necessary or desirable, it can be treated with adsorbents (i.e. charcoal) or passed through exchange resins. Possibly, the precursor nitroaromatic compound will contain some unreacted polyol or polythiol which will result in hydrogenated product mixtures which are not fully capped. That is to say, the aminoaromatic product (I) will contain minor proportions of polyol or polythiol components. For the most part, such components are not in any way harmful to the ultimate utility of the compounds (I) and need not be separated from the product unless desired or necessary.

In respect of the preparation of the nitroaromatic compounds (II), while the above schematic equation sets forth one embodiment therefor, it is not necessarily limited thereto. Any conventional method may be employed. For example, the appropriate alkali-nitrophenolate can be condensed with the appropriate polyhalogen terminated compound. Alternatively, and, preferably, a polyol or polythiol (IV) having n hydroxyl or mercapto groups is reacted with at least n equivalent moles of the nitro halo-substituted benzene (III) in the presence of strong bases such as sodium hydroxide, potassium hydroxide, lithium hydroxide, sodium methoxide, sodium ethoxide, potassium methoxide, and the like, in an inert solvent. The term "inert solvent" means any solvent which does not react with any of the reactants or products nor otherwise interfere with the overall process. Typical solvents include benzene, toluene, xylene, chlorobenzene, dichlorobenzene, nitrobenzene, and the like; ethers such as tetrahydrofuran, dioxane, and the like. Generally speaking, the reaction is carried out at about 20° C. to about 200° C., preferably from about 35° C. to about 100° C. and for a period necessary to consume the reactants (III) and (IV). Any convenient analytical method for determining the presence of these reactants can be employed to monitor the progress of the reaction. For example, thin layer chromatography, gel permeation chromatography, nuclear magnetic resonance, infrared, and the like are useful methods. Aliquot samples can be removed and tested for the reactants until the process is completed. The compounds (II) are isolated by conventional procedures such as filtration, removal of solvent under atmospheric and/or reduced pressure resulting in the isolation of (II). The conversion of the polyols (polythiols) (IV) to (II) can be considered as a "capping" process wherein the nitrophenyl ring is the capping agent. In some cases the capping is not 100 percent complete and a minor proportion of unreacted polyol or polythiol will be present with (II). As noted previously, this minor component need not be removed but if desired it can be separated by conventional methods. Notably, it can be carried over to the aminoaromatic compounds (I) without adverse effects on the ultimate utility of the latter in polymer addition formation.

Illustrative of the starting nitrohalobenzenes (III) but not limiting thereof are 4-nitrochlorobenzene, 4-nitrobromobenzene, 4-nitrofluorobenzene, 4-nitroiodobenzene, 2-nitrochlorobenzene, 2-nitrobromobenzene, 2-nitrofluorobenzene, 2-nitroiodobenzene, 3-nitrochlorobenzene, 4-nitro-3-methylchlorobenzene, 4-nitro-3-ethylchlorobenzene, 4-nitro-3-butylchlorobenzene, 4-nitro-3-hexylchlorobenzene, 4-nitro-3-octylchlorobenzene, 2-nitro-4-methylchlorobenzene, 2-nitro-4-ethylchlorobenzene, 2-nitro-4-butylchlorobenzene, 2-nitro-4-hexylchlorobenzene, 2-nitro-4-octylchlorobenzene, 4-nitro-3-phenylchlorobenzene, 2-nitro-4-phenylchlorobenzene, 4-nitro-3-benzylchlorobenzene, 2-nitro-4-benzylchlorobenzene, 2-nitro-4-cyclobutylchlorobenzene, 2-nitro-4-cyclopentylchlorobenzene, 2-nitro-4-cyclohexylchlorobenzene, 4-nitro-2-methoxychlorobenzene, 2-nitro-4-methoxychlorobenzene, 2-nitro-4-ethoxychlorobenzene, 2-nitro-4-butoxychlorobenzene, and the like; 2,4-dinitrochlorobenzene, 2,4-dinitroiodobenzene, 2,4-dinitrobromobenzene, 2,4-dinitrofluorobenzene, 2,4-dinitro-3-methylchlorobenzene, 2,4-dinitro-5-methylchlorobenzene, 2,4-dinitro-6-methylchlorobenzene, 2,4-dinitro-3-ethylchlorobenzene, 2,6-dinitrochlorobenzene, 3,5-dinitro-chlorobenzene, and the like.

As noted above, the novel polyamines (I) can be provided with varying reactivities in respect of the amine functions. It has been observed that this property depends primarily on the position of the amine group(s) on the aromatic ring and their number. Ortho- and para-substitution provides the widest control of amine reactivity particularly when y is equal to one. Accordingly, a preferable class of starting compounds (III) comprises those wherein the nitro group is in the ortho or para position relative to the halogen atom when y equals one or occupying both positions when y equals two. For the slowest amine activities, it is even more preferable that y equals one and the nitro group be in the ortho position. Thus, these same preferences apply to the formed poly(nitroaromatic) compounds (II) and poly(aminoaromatic) compounds (I). It is further preferred that A be hydrogen.

The polyols or polythiols (IV) include any of the known polyols and polythioether polythiols and polythiols meeting the defined limits set forth above when describing the residue R. Preferably (IV) is a polymeric polyol having a functionality n of from about 2 to about 4 and a molecular weight of from about 1500 to about 6000. Accordingly, these preferred limitations apply to the compounds (I) and (II) so that X is —O— and R is the residue of a polymeric polyol so described.

Illustrative, but not limiting, of the classes of polyols which can be used are the polyoxyalkylene polyethers; polyester polyols, polyol adducts derived from ethylene oxide with methylenedianiline and polymethylene polyphenylamine mixtures (in accordance with U.S. Pat. No. 3,499,009); polyols obtained by the Mannich condensation of a phenolic compound with formaldehyde, an alkanolamine, and ethylene oxide (in accordance with U.S. Pat. No. 3,297,597); vinyl reinforced polyether polyols, e.g. polyols obtained by the polymerization of styrene or acrylonitrile in the presence of the polyether; polyacetals prepared from glycols such as diethylene glycol and formaldehyde; polycarbonates, for example those derived from butanediol with diarylcarbonates; polyester amides, the resole polyols (see Prep. Methods of Polymer Chem. by W. R. Sorenson et al., 1961, page 293, Interscience Publishers, New York, N.Y.); and the polybutadiene resins having primary hydroxyl groups (see Poly Bd. Liquid Resins, Product Bulletin BD-3, October 1974, Arco Chemical Company, Div. of Atlantic Richfield, New York, N.Y.).

A preferred group of polyols comprises the polyalkyleneoxy polyols free of sulfur, in particular polymers of ethylene oxide, propylene oxide, butylene oxide, tetrahydrofuran or polyether polyols which contain propylene oxide units alone or in combination with ethylene oxide in any sequence. Polyols of this type are well known and, for the most part, are commercially available. Generally speaking, they are easily prepared by polymerizing the desired alkylene oxide in the presence of a starter such as water, ethylene glycol, propylene glycol, aniline, glycerol, trimethyolpropane, pentaerythritol, methylglucoside, mixtures thereof, and the like.

Accordingly, a preferred subclass of compounds according to formulae (I) and (II) in accordance with the present invention are those wherein —X— is —O—, R is the residue after removal of hydroxyl groups of a polymeric polyol having a molecular weight of from about 1500 to about 6000 and a functionality n of from 2 to 4, y is 1 and said $NH_2$ or $NO_2$ groups being in the ortho or para position relative to —O— and A is hydrogen.

The production of synthetic resins, and particularly molded resins, from the compounds (I) according to the present invention by the polyisocyanate polyaddition process is carried out using any of the methods already known to those skilled in the art in respect of polyurethane chemistry. For general teaching and preparative methods see Saunders and Frisch, Polyurethanes: Chemistry and Technology, Parts I and II, 1962 and 1964, respectively, John Wiley and Sons, New York, N.Y.

Accordingly, the compound (I) can be the sole reactant with the polyisocyanate in which case the major recurring units are linked through polyurea linkages. In other optional embodiments, polymeric polyols of the type described above under (IV) can be employed in varying proportions and/or extenders. In such an optional embodiment, polyurethane and/or additional urea linkages are also present. In a preferred embodiment an extender is employed in combination with (I).

In a particularly preferred embodiment for the preparation of the synthetic resins, the polyaddition is carried out in the presence of a low molecular weight extender of from about 62 to about 400. Typical of such extenders are ethylene glycol, 1,4-butanediol, 1,6-hexanediol, 1,4-cyclohexanedimethanol, neopentyl glycol, bis(2-hydroxyethyl)ethers of hydroquinone and resorcinol, hexamethylene diamine, octamethylene diamine, 2,4-diaminotoluene, 2,6-diaminotoluene, 4,4'-diamino-3,3'-dichlorodiphenylmethane, 2,4-diamino-3,5-diethyl toluene, 2,6-diamino-3,5-diethyl toluene, and mixtures of two or more of any of the above.

The relative equivalent proportions of said extender per equivalent of said (I) advantageously falls within the range of about 1:1 to about 80:1, preferably, from about 3:1 to 8:1.

The polyisocyanates employed can be any of the organic di- or higher functionality polyisocyanates known to be useful for such polyaddition product preparation. The preferred class of polyisocyanates is that which comprises the aromatic polyisocyanates.

Illustrative of the polyisocyanates but not limiting thereof are hexamethylenediisocyanate, isophoronediisocyanate, methylenebis(cyclohexyl isocyanate), m- and p-phenylene diisocyanate, 2,4- and 2,6-toluene diisocyanate and mixtures of these two isomers, methylenebis(phenyl isocyanate) inclusive of 4,4'-methylenebis(phenyl isocyanate), 2,4'-methylenebis(phenyl isocyanate), and mixtures of these methylenebis(phenyl isocyanate) isomers in any proportion, 3,3'-dimethyl-4,4'-diisocyanatodiphenyl methane; polymethylene polyphenylisocyanate mixtures comprising about 20 to about 80 percent methylenebis(phenyl isocyanate) with the remainder of the mixture being polyisocyanates of functionality greater than 2, liquefied forms of methylenebis(phenyl isocyanate) particularly liquefied forms (including mixtures containing up to about 30 percent of the 2,4'-isomer) of 4,4'-methylenebis(phenyl isocyanate) such as the carbodiimide-containing 4,4'-methylenebis(phenyl isocyanates) having isocyanate equivalent weights of from about 130 to about 180 prepared for example by heating 4,4'-methylenebis(phenyl isocyanate) with a carbodiimide catalyst to convert a portion of said isocyanate to carbodiimide; and liquefied forms of 4,4'-methylenebis(phenyl isocyanate) which have been reacted with minor amounts (from about 0.04 to about 0.2 equivalent per equivalent of isocyanate) of low molecular weight glycols such as dipropylene glycol, tripropylene glycol, and mixtures thereof; isocyanate terminated prepolymers having an isocyanate content of about 9 to about 20 percent by weight prepared from methylenebis(phenyl isocyanate) and a polyol having a functionality from 2 to 3 selected from polyalkyleneoxy polyols of molecular weight 1000 to 10,000, polytetramethylene glycols of molecular weight 600 to 5000, and polyester polyols of molecular weight 500 to 8000, said polyol and said methylenebis(phenyl isocyanate) being reacted in the proportions of about 0.01 equivalent to about 0.5 equivalent of said polyol per isocyanate equivalent. Preferred polyisocyanates are the diisocyanates and particularly the liquefied methylenebis(phenyl isocyanates) described above.

The proportions of polyisocyanate to the total active hydrogen equivalents comprised of (I), any optional polymeric polyol, and extender are such that the ratio of isocyanate equivalents to total active hydrogen equivalents falls within a range of from about 0.85:1 to about 1.20:1, preferably from about 0.95: to about 1.10:1.

Any of the urethane catalysts disclosed in the art can be employed. Such catalysts include organic and inorganic acid salts of, and organometallic derivatives of bismuth, tin, lead, antimony, cobalt, and the like. A preferred group includes stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isooctyl thioglycolate) and the like, triethylamine, triethylenediamine, N,N,N',N'-tetramethylethylenediamine, N-methylmorpholine, N,N-dimethylcyclohexylamine, and the like, and mixtures of any of the above.

Optionally, blowing agents may be employed for the formation of cellular micro-cellular, and self-skinned molded parts characterized by tough skinned surfaces. Other optional additives include, illustratively, dispersing agents, cell stabilizers, surfactants, internal mold release agents, flame retardants, colorants, reinforcing agents, fiberglass roving and mats, and the like.

As noted previously, the unexpected differences in amine reactivity of the compounds (I) over prior art compounds as discussed above allows for the formation of polymer polyaddition products at differing speeds over prior art preparations. This provides a very useful addition to the types of polyamines available for reaction with other condensans in providing molded polymer articles.

Typical of the molded synthetic resins formed by the present compounds are solid cast elastomers, solid and micro-cellular RIM elastomers and elastoplastics. Such products find utility as auto parts including bumpers, body elements, panels, doors, hoods, skirts, air scoops, and the like.

The above described synthetic resins can be readily prepared in solution using conventional solvent polymerization techniques. Typical solvents are dipolar aprotic solvents such as dimethylformamide, dimethylacetamide, dimethylsulfoxide and the like; ketones such as acetone, methyl ethyl ketone, methyl isobutyl ketone, and the like; ethers such as dioxane, tetrahydrofuran, and the like. When the polyaddition products are so prepared, then films can be readily cast from the solutions using conventional methods.

Alternatively, the solutions can be used for coating compositions for wire coatings, casting or spraying of polymer films on a variety of substrates such as metal, ceramic, fabrics, and the like.

The following examples describe the manner and process of making and using the invention and set forth the best mode contemplated by the inventors of carrying out the invention but are not to be construed as limiting.

EXAMPLE 1

A one-liter four-necked flask was equipped with a mechanical stirrer, reflux condenser, thermometer, and air inlet tube. The flask was charged with 200 g. (0.1 mole) of a 2000 molecular weight polypropyleneoxy-polyethyleneoxy diol containing about 12 percent by weight ethyleneoxy units, 20 g. (0.5 mole) of powdered sodium hydroxide and 400 ml. of toluene. A very slow stream of air was maintained in the flask and after about fifteen minutes, 31.5 g. (0.2 mole) of 2-nitrochlorobenzene dissolved in 100 ml. of toluene was added. The resulting reaction mixture was stirred at room temperature for two hours during which time the temperature of the solution rose to 38° C. and then returned to ambient (about 27° C.).

The reaction mixture was heated at 65° to 70° C. for 4 hours by means of an oil bath. Thin layer chromatography (TLC) analysis, using a silica gel plate and developing in a 23/2 (V/V) mixture of cyclohexane/ethyl acetate, showed that the majority of the 2-nitrochlorobenzene had reacted. The reaction mixture was cooled to about 10° to 15° C. and acidified by adding 30 ml. of concentrated hydrochloric acid in 125 ml. of water and stirred until it turned to a light yellow color. The mixture was transferred to a separatory funnel followed by washings from the flask consisting of 100 ml. of toluene and 15 ml. of water. The organic layer was separated and washed with 2×200 ml. of water then dried by storage over magnesium sulfate. Solvent was removed in vacuo using a rotary evaporator under water pump pressure (about 10 mm. of mercury) leaving a reddish-orange colored syrup. Vacuum distillation of this syrup removed the unreacted 2-nitrochlorobenzene (1.7 g.) at b.p. (0.05 mm. of mercury)=150° to 60° C. The product yield was 207.4 g. of residual oil and overall yield based on recovered nitrochlorobenzene was 94.6%. TLC analysis showed the product to be free of nitrochlorobenzene and was a single component. Thus there was obtained a di(nitroaromatic) compound according to formula (II) above wherein the diol residue was a polypropyleneoxypolyethyleneoxy glycol having a molecular weight of about 2000, i.e. n=2, with the nitro groups in the ortho positions on the aromatic ring.

A 213.6 g. (0.1 mole) sample of the di(nitroaromatic) compound described above but obtained from a different preparation, was charged to a 2 liter high pressure hydrogenation flask followed by 1.0 g. of 10% palladium on charcoal and 700 ml. of methanol. The flask was charged to 60 psig pressure of hydrogen in a Parr shaker where a maximum of about 40 psi of hydrogen pressure was consumed over about one hour at ambient temperature (about 20° C.). The reaction mixture was filtered to remove the catalyst providing a clear practically colorless solution. Solvent was removed on a rotary evaporator at about 70° C. under about 10 mm. of mercury pressure followed by higher vacuum (about 0.05 mm. of mercury). The residue was 205.0 g. of a light brown syrup; amine eq. wt.=1159 (Theory=1092). Thus there was obtained a di(aminoaromatic) compound according to formula (I) above wherein the diol residue and value of n are as described for the precursor di(nitroaromatic) compound above and the amino groups are in the ortho positions o the aromatic ring.

The relative reactivity of this di(aminoaromatic) compound relative to 4,4′-methylenedianiline was measured by injecting simultaneously into an infrared cell 100 microliters of a 1.5 wt. percent solution of phenylisocyanate dissolved in dimethylsulfoxide and 100 microliters of an equivalent proportion of the diamine (13.9 wt. percent) in dimethylsulfoxide and observing the disappearance of the isocyanate band (2250 cm$^{-1}$) with time at ambient temperature (20° to 30° C.). The control methylenedianiline was assigned the value of unity (1) and the value for the di(aminoaromatic) compound was observed as 0.04.

EXAMPLE 2

Using the same reactants, proportions, and procedure set forth in Example 1 with the exceptions set forth below, there was produced a di(nitroaromatic) compound (II) in accordance with the present invention.

The polypropyleneoxy-polyethyleneoxy diol was dissolved in 300 ml. of toluene followed by bubbling in air for about five minutes. During stirring, 31.5 g. (0.2 mole) of 4-nitrochlorobenzene was added to the solution. After ten minutes, the 20 g. of sodium hydroxide was added followed by the remaining 100 ml. portion of toluene. Stirring was continued for approximately one hour at the solution temperature of 27° to 28° C. TLC analysis of an aliquot sample showed no reaction had occurred. The solution was heated at 62° to 90° C. over a five and one-half hour period. TLC analysis showed the presence of some unreacted nitrochlorobenzene.

The solution was cooled to 15° to 20° C. and acidified by adding the 30 ml. of concentrated hydrochloric acid in 100 ml. of water during constant stirring. The light colored solution was transferred to a separatory funnel followed by a 100 ml. toluene wash. On standing, the formed emulsion settled and the aqueous layer separated. The organic layer was washed with 3×200 ml. portions of water then dried over magnesium sulfate. Solvent was removed as described in Example 1 leaving a light orange colored liquid. Vacuum distillation of the liquid at 150° to 160° C. under 0.05 mm. of mercury pressure provided 8.2 g. of 4-nitrochlorobenzene. There was obtained 212 g. of the di(nitroaromatic) compound in 74% yield based on recovered nitrochlorobenzene.

A 203 g. sample of the above compound was hydrogenated according to the procedure described in Example 1. A 2.0 g. quantity of the 10% palladium on charcoal was used along with the 700 ml. of methanol. The flask was charged to 60 psig pressure of hydrogen and over a four and one-half hour period at ambient temperature (about 20° C.) about 29 psi of hydrogen was consumed. The reaction mixture was worked up as described in Example 1 to provide 197 g. of a viscous liquid; amine eq. wt.=1600 (theory=1092). Thus there was obtained a di(aminoaromatic) compound according to formula (I) above wherein the diol residue and value of n are as described for the precursor di(nitroaromatic) compound above and the amino groups are in the para positions of the aromatic ring. The percent capping was 68.2%. Using the same infrared method noted above, the relative reactivity of the di(aminoaromatic) compound was 4.8. Thus the para-substituted compound was considerably more reactive than the ortho-isomer of Example 1.

EXAMPLE 3

Using essentially the same procedure as described in Example 1 but on a smaller scale, 80 g. (0.04 mole) of a polypropyleneoxy glycol having a molecular weight of about 2000 was charged to the reaction flask followed by 8.0 g. (0.2 mole) of powdered sodium hydroxide, 12.6 g. (0.08 mole) of 2-nitrochlorobenzene and 200 ml. of toluene. The reactants were stirred at ambient temperature (about 20° C.) for one hour. Following this, the stirred solution was slowly heated up to about 69° C. over a four and one-half hour period at which time a TLC analysis on an aliquot sample showed primarily the one product spot with a small residue spot of 2-nitrochlorobenzene.

The cooled solution (lower than 20° C.) was treated with 15 ml. concentrated hydrochloric acid in 50 ml. of water, stirring vigorously until it was light yellow in color. It was transferred to a separatory funnel and allowed to settle into two layers. The organic layer was removed, washed with 2×100 ml. portions of water and dried over magnesium sulfate. Solvent was removed using a rotary evaporator as previously described. Vacuum distillation at 150° to 160° C. under 0.1 mm. of mercury pressure provided 1.2 g. of unreacted 2-nitrochlorobenzene. Thus, there was obtained 86.3 g. of the di(nitroaromatic) compound in accordance with formula (II) above wherein the diol residue was a polypropyleneoxy glycol having a molecular weight about 2000, i.e., n=2, with the nitro groups in the ortho position on the aromatic ring. The percent capping of the glycol was 90.4% based.

A 63.6 portion of the above di(nitroaromatic) compound was hydrogenated in the presence of 0.5 g. of 5% palladium on charcoal in 200 ml. of methanol using the procedure generally described above using a Parr shaker. The reaction bottle was charged to 60 psig pressure of hydrogen. Over a period of one hour and 15 minutes at ambient temperature (about 20° C.), about 24 psi of hydrogen was consumed. After standing overnight, the pressure bottle was shaken for an additional hour but no further hydrogen uptake was noted. The reaction mixture was worked up as previously described by first filtering off the catalyst and then removing methanol under vacuum to provide 61.7 g. of a light brown liquid; amine eq. wt.=1224 (theory=1092). Thus there was obtained a di(aminoaromatic) compound according to formula (I) above wherein the diol residue and value of n are as described for the precursor di(nitroaromatic) compound above and the amino groups are in the ortho-positions of the aromatic ring. The percent capping was 89.2%.

EXAMPLE 4

Using the apparatus and procedure set forth in Example 1, 200 g. (0.04 mole) of a 5000 molecular weight polypropyleneoxy-polyethyleneoxy capped triol containing about 20% ethyleneoxy groups was mixed with 300 ml. of toluene under a steady stream of air. A 19.2 g. (0.12 mole) sample of 2-nitrochlorobenzene was added followed after about five minutes by 12.2 g. (0.3 mole) of powdered sodium hydroxide. Stirring was carried out at room temperature. In about ten minutes (at 26° C.), the sodium hydroxide was all dissolved. After about two hours of stirring at about 24° to 28° C., the stirred solution was heated for a period of about five hours at a temperature of about 30° to about 60° C. The solution was cooled and added to it with stirring was 25 ml. of concentrated hydrochloric acid dissolved in 100 ml. of water which resulted in formation of an emulsion. The emulsion was broken by the addition of 500 ml. of ethyl acetate. Separation of the organic layer was effected and it was dried by storage over magnesium sulfate. Solvent was removed in vacuo using a rotary evaporator under water pump pressure (about 10 mm. of mercury) followed by vacuum distillation at about 130° to 140° C. (under about 0.1 mm. of mercury) yielding the unreacted nitrochlorobenzene (1.5 g.). TLC analysis of the residue oil showed a trace of nitrochlorobenzene. Further heating of the oil in a wide film evaporator at 180° C. (0.1 mm. of mercury) removed the last trace of starting material. The product yield was 216 g. of oil. Thus there was obtained a tri(nitroaromatic) compound according to formula (II) above wherein the triol residue was that of a polypropyleneoxy-polyethyleneoxy triol described above, and n=3 with the nitro groups in the ortho positions on the three aromatic rings. The percent yield or capping was 92%.

A 100 g. sample of the tri(nitroaromatic) compound obtained above was hydrogenated in the presence of 1.0 g. of 5% palladium on charcoal in 150 ml. of methanol using the procedure previously described. The reaction bottle was charged to 50 psig of hydrogen. Over a period of shaking of four and one-half hours 11.5 psi of hydrogen pressure was consumed. The bottle was repressured to 50 psig but after about one hour of shaking only 0.5 psi of hydrogen was consumed. The reaction mixture was worked up as previously described by first filtration followed by methanol removal under vacuum to provide 97.3 g. of liquid residue; amine eq. wt.=1989 (theory=1727). Thus there was obtained a tri(aminoaromatic) compound according to formula (I) above wherein the triol residue is described as above for the precursor and the amino groups are in the ortho positions of the three aromatic rings. The percent capping was 87%.

EXAMPLE 5

Using essentially the same procedure as described in Example 1 but on a smaller scale and except as noted below, 40.0 g. (0.02 mole) of a polypropyleneoxy glycol having a molecular weight of about 2,000 was charged to a 500 ml. reaction flask along with 125 ml. of toluene and 4.0 g. (0.1 mole) of powdered sodium hydroxide. A gentle stream of air was bubbled into the stirred solution for 15 minutes. Following this, a solution of 8.1 g. (0.04 mole) of 2,4-dinitrochlorobenzene dissolved in 20 ml. of toluene was added from an addition funnel over a period of about 2 hours at a solution temperature of 25° to 27° C. At that time, gel permeation chromatography showed a 72 percent conversion which increased to 98 percent one hour later and reached 100 percent after another hour of stirring at 24° to 26° C. TLC analysis using the test conditions set forth in Example 1 showed complete consumption of 2,4-dinitrochlorobenzene.

The reaction mixture was diluted with 100 ml. toluene, cooled to 10° to 15° C. and acidified by adding 10 ml. of concentrated hydrochloric acid in 100 ml. water during gentle mixing. The dark colored reaction mixture turned light orange. The orange organic layer was separated and washed with 2×100 ml. portions of water and dried by storage over magnesium sulfate. Solvent was removed in vacuo using a rotary evaporator under water pump pressure (about 10 mm. of mercury) leaving 45.0 g. of reddish colored viscous liquid; capping was 100 percent and gel permeation chromatography showed only one component. Thus there was obtained a di(nitroaromatic) compound according to formula (II) above wherein the diol residue was a polypropyleneoxy glycol having a molecular weight of about 2,000, i.e., n=2, y=2 with the nitro groups in the ortho and para positions on the aromatic ring and A is hydrogen.

A 10.8 g (0.0044 mole) portion of the above di(nitroaromatic) compound was hydrogenated in the presence of 0.5 g. of 3% palladium on charcoal in 100 ml. of methanol using the procedure generally described above using a Parr shaker. The reaction bottle was charged to 50 psig of hydrogen. Over a period of about four hours (at about 20° C.) 3.5 psi of hydrogen was consumed. The catalyst was removed by filtration followed by removing methanol in a rotary evaporator first under about 10 mm of mercury pressure and then 0.05 mm to yield 9.5 g. of dark brown liquid; amine eq. wt.=710 (theory=553). This amine eq. wt. calculates out to 77.9 percent reduction with 23.1 percent unreacted nitro group content. Thus there was obtained a mixture containing predominantly a di(aminoaromatic) compound according to formula (I) above wherein the diol residue and value of n and y are as described above for the precursor di(nitroaromatic).

EXAMPLE 6

Using the same procedure as described in Example 1, 22.9 g. of a polypropyleneoxy polyol obtained from propoxylating a mixture of glycerine and sugar (eq. wt.=115, average functionality=about 4) was charged to a 500 ml. flask along with 21 ml. toluene and 32.8 g. of potassium hydroxide in 21 ml. water and 31.5 g. of orthonitrochlorobenzene. The reaction mixture was stirred for 2 hours at room temperature during which time no temperature rise was observed. The mixture was heated at 65° to 67° C. for 4 hours by means of an oil bath. After 2 hours into the heating period, gel permeation chromatography showed 40 percent capping reacting a maximum of 60 percent at the 4 hour period.

The mixture was cooled, diluted with 100 ml. of water and transferred to a separatory funnel along with 20 ml. of rinse toluene. The separated organic layer was washed with dilute hydrochloric acid, followed by dilute sodium bicarbonate wash and finally with plain water. The organic layer was dried over magnesium sulfate. Solvent was removed in vacuo using a rotary evaporator followed by distillation of the residue to remove unreacted o-nitrochlorobenzene (12.6 g.) at b.p. (0.05 mm of mercury)=130° to 170° C. The product yield was 32 g. of a dark colored syrup which was 60% capped by the nitroaromatic residue. Thus, there was obtained a mixture containing a di(nitroaromatic) compound having an overall average structure according to formula (II) above wherein R is the residue after removal of the hydroxyl groups of the starting polyol mixture having an average molecular weight of about 460 (4×115 eq. wt.), n=4, y is 1 with the nitro group in the ortho position and A is hydrogen. This product is referred to as having an overall average structure of formula (II) because of the presence of unreacted starting polyol along with partially capped polyol components in the mixture.

A 28. g. sample of the above nitroaromatic compound mixture was hydrogenated in the presence of 0.3 g. of 3% Pd/c in 100 ml. methanol using the Parr shaker. The reaction bottle was charged to 50 psig hydrogen. Over a period of about 3 hours 20 psi of hydrogen was consumed at room temperature. The catalyst was removed by filtration followed by solvent removal first under 10 mm. then 0.05 mm. mercury to yield 25.0 g. of dark brown liquid; amine eq. wt.=316 (theory=205). Thus there was obtained a mixture containing a poly(aminoaromatic) compound according to formula (I) above wherein the polyol residue, and values of n and y are as described above for the precursor nitroaromatic compound with overall capping of about 60%.

EXAMPLE 7

The following example describes the preparation of a molded synthetic resin containing polyurea linkages in accordance with the present invention.

A 400 ml. beaker was charged with 100 g. (0.0874 eq.) of the di(aminoaromatic) compound according to Example 3 above but obtained from a different preparation (amine eq. wt.=1144), 15 g. (0.484 eq.) of ethylene glycol, and 0.1 g. of dibutyltin dilaurate. An 84.1 g. (0.584 eq.) sample of a liquefied form of 4,4'-methylenebis(phenyl isocyanate), in which a portion of the isocyanate groups have been converted to carbodiimide (I.E.=143), was added quickly to the beaker. The mixture was vigorously stirred for 8 seconds using a wooden tongue depressor and immediately poured into an 8"×8"×⅛" hand-clamped aluminum mold which was at 250° F. Demold time was 2 minutes. The molded plaque was then cured for one hour at 250° C. A separate, but, identically prepared, plaque was characterized by the following physical properties:

Density: 1.111 g./cc.
Tensile strength (psi): 2140
Tensile modulus (psi): 4500
Elongation (%): 230
Hardness, Shore A: 92
Die C Tear (pli): 340

EXAMPLE 8

The following example describes the preparation of films containing polyurea linkages in accordance with the present invention.

A 500 ml. reaction flask was equipped with a stirrer, thermometer, addition funnel, and reflux condenser. The flask was charged with 10 g. (0.00874 eq.) of the di(aminoaromatic) compound described in Example 5 above, 1.5 g. of ethylene glycol, two drops of dibutyltin dilaurate, and 50 ml. of dimethylacetamide. A solution of 8.4 g. (0.0584 eq.) of the liquified 4,4'-methylenebis(phenyl isocyanate) described in Example 5 above dissolved in 50 ml. of dimethylacetamide was charged to the addition funnel. The isocyanate solution was added to the reaction flask during stirring and at the rate of about 10 ml. per minute. Following this, the solution was heated at 145° C. for about 2 hours. Infrared analysis on aliquot samples showed the completion of reaction at the end of the 2 hour period by the absence of any isocyanate absorption.

The reaction solution which contained the polyurea-polyurethane resin at about 20 percent by weight concentration was transferred to a vacuum rotary evaporator. Dimethylacetamide was removed under about 10 mm. of mercury pressure and 80° C. temperature until a solids concentration of at least 80 percent was reached.

A drop of DC-190 surfactant (a silicone surfactant supplied by Dow-Corning Corporation, Midland, Mich.) was added to the polymer concentrate solution.

Three separate films were prepared by casting three separate lots of concentrate solution respectively on (1) aluminum foil, (2) Mylar film, and (3) a glass plate. In each case a doctor knife adjusted to 15 mil. height was used to apply the concentrate onto the substrate. This provided final films of about 10 mil. The cast films on their respective substrates were dried according to the following cycle: (1) 30 minutes at ambient (about 20° C.) temperature; (2) oven at about 60° C. for about 3 minutes; and (3) vacuum oven (about 1 mm. of mercury pressure) at about 30° C. for about 2 hours.

The aluminum foil provided the easiest film release, although both the glass and Mylar provided perfectly useful film release.

The polyurea-polyurethane film was characterized by the following physical properties:

Density 1.201 g./cc.
Tensile strength (psi): 690
Modulus (psi): 14,420
Elongation (%): 30

We claim:

1. A poly(aminoaromatic) compound having the formula

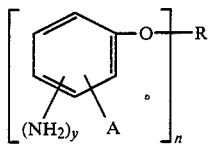

(I)

wherein R is the residue after removal of hydroxyl groups of a polymeric polyol selected from the group consisting of polyoxylakylene polyethers, polyester polyols, polyol adducts derived from ethylene oxide with methylenedianiline and polymethylene polyphenylamine mixtures, polyols obtained by the Mannich condensation of a phenolic compound with formaldehyde, an alkanolamine, and ethylene oxide, vinyl reinforced polyether polyols, polyacetal polyols, polycarbonate polyols, polyesteramine polyols, resole polyols, and the polybutadiene polyols, having a molecular weight of from about 400 to about 10,000 and a functionally n of from about 2 to about 6, y is 1 or 2 and A is selected from the group consisting of hydrogen and an inert substituent.

2. A compound according to claim 1 wherein y is 2.

3. A compound according to claim 1 wherein y is 1 and said NH$_2$ group is in the ortho or para position relative to the —O—.

4. A compound according to claim 3 wherein said NH$_2$ group is in the ortho position.

5. A compound according to claim 1 wherein said A is hydrogen.

6. A compound according to claim 1 wherein R is the residue after removal of hydroxyl groups of a polymeric polyol having a molecular weight of from about 1500 to about 6000 and a functionality n of from about 2 to about 4, y is 1 and said NH$_2$ group is in the ortho or para position relative to 0 and A is hydrogen.

7. A compound according to claim 6 wherein R is the residue of a polypropyleneoxy-polyethyleneoxy glycol having a molecular weight of about 2,000, n=2 and said NH$_2$ is in the para position.

8. A compound according to claim 6 wherein R is the residue of a polypropyleneoxy-polyethyleneoxy glycol having a molecular weight of about 2,000, n=2 and said NH$_2$ is in the ortho position.

9. A compound according to claim 6 wherein R is the residue of a polypropyleneoxy glycol having a molecular weight of about 2,000, n=2 and said NH$_2$ is in the ortho position.

10. A compound according to claim 6 wherein R is the residue of a polyethyleneoxy capped polypopyleneoxy triol having a molecular weight of about 5,000, n=3 and said NH$_2$ is in the ortho position.

11. A compound according to claim 1 wherein R is the residue after removal of hydroxyl groups of a polymeric polyol having an average molecular weight of about 400 to about 500, an average functionality of about 4, y is 1 and said NH$_2$ group is in the ortho position and A is hydrogen.

12. A compound according to claim 1 wherein R is the residue of a polypropyleneoxy glycol having a molecular weight of about 2,000, n=2, y is 2 and said NH$_2$ groups are in the ortho and para position relative to the —O— and A is hydrogen.

* * * * *